United States Patent [19]

Apetrei et al.

[11] Patent Number: 4,477,743
[45] Date of Patent: Oct. 16, 1984

[54] BRAKE-MOTOR

[75] Inventors: Constantin Apetrei; Victor Nitigus; Elek Demeter; Marian Radulescu; Toma Sachelarie, all of Bucuresti, Romania

[73] Assignee: Institutul De Cercetare Stiintifica Si Inginerie Technologica Pentru Industria Electrotehnica, Bucharest, Romania

[21] Appl. No.: 387,889

[22] Filed: Jun. 3, 1982

[51] Int. Cl.³ .......................................... H02K 7/102
[52] U.S. Cl. .................................................... 310/77
[58] Field of Search ............................ 310/76, 77, 78

[56] References Cited

U.S. PATENT DOCUMENTS

| 2,536,491 | 0/0000 | Chapman et al. | |
|---|---|---|---|
| 3,683,217 | 8/1972 | Agalakov et al. | 310/77 |
| 4,129,797 | 12/1978 | Lindner | 310/77 |

FOREIGN PATENT DOCUMENTS

| 2819942 | 11/1979 | Fed. Rep. of Germany. |
| 2211789 | 7/1974 | France. |
| 2409629 | 6/1979 | France. |
| 729758 | 10/1978 | U.S.S.R.. |

Primary Examiner—Donovan F. Duggan
Attorney, Agent, or Firm—Karl F. Ross; Herbert Dubno

[57] ABSTRACT

The invention refers to a brake electrical asynchronous motor with short-circuit rotor and double drive, where its own magnetic field simultaneously generates both the revolving field on the rotor, and the electromagnetic force for deblocking the brake.

4 Claims, 2 Drawing Figures

BRAKE-MOTOR

FIELD OF THE INVENTION

The invention relates to a braking electrical asynchronous motor with a short-circuited rotor.

BACKGROUND OF THE INVENTION

Asynchronous motors, with conical rotor and brake, where the rotor magnetic field generates, besides the rotation torque, a rotor axial movement, deblocking the brake, are well known. These motors have the disadvantage of a very complicated construction, are difficult to build from a technological viewpoint, and result in an abnormal use of the magnetic circuit and of the driving shaft displacement when connected or disconnected to the power line.

Asynchronous motors with braking, where the brake-deblocking electromagnetic force is obtained using the magnetic field created by the current flowing through the rotor short-circuiting ring, are also known. These motors have the disadvantage that the motive force that acts upon the brake deblocking armature diminishes significantly from the starting moment to the moment of reaching the operational speed, the final value of this force being very low and precluding the obtaining of sufficient braking torques.

There are also asynchronous motors with brakes where, in order to generate the brake-deblocking force, the stator inductive magnetic field is used, the stator being longer than the rotor, the respective supplementary portion being conically turned hollow, so that the brake-deblocking armature active zone enters the hollow and has only axial movement on the shaft. All these motors have the disadvantage of a substantial increase of the machine length, as well as unsafe operation due to the possibilities of blocking the brake deblocking armature at its joint with the shaft.

SUMMARY OF THE INVENTION

The present invention eliminates the disadvantages of the above-mentioned motors, in that the motor of the invention is made with a normal stack of stator sheets expanded by a supplementary stack of statoric sheets with the same number of slots, both of them having a common excitation winding, a normal stack of rotor sheets, with ventilation flanges only on the side of the rotor opposite the supplementary stack of statoric sheets, and a brake deblocking armature, mounted on the shaft by means of a bearing, that offers the possibility of the axial displacement without revolving with the shaft, with two active surfaces, one in front of the stack of rotoric sheets, under the rotor short-circuiting ring, and the other in front of the supplementary stack of statoric sheets. In the central area inside the statoric winding, the supplementary stack of statoric sheets has the same number of slots as the normal stack of statoric sheets, and the teeth between the slots are elongated inwards in order to lower the magnetic field dispersion and to guide it in order to axially close through the active area of the brake deblocking armature. In front of the supplementary stack of stator sheets central area, the active part of the brake deblocking armature under the stator winding, is formed as a torus, by coiling of electrotechnical sheet, in order to promote the magnetic field penetration and to lower losses by eddy currents. The brake deblocking armature has members that protrude into the motor exterior through the holes in the shield on the ventilator side, that holds one of the friction parts, axially pressed by springs against and the friction limb that plays at the same time the ventilator part, fixed on the shaft by means of a cylindrical sliding fit and a key.

SPECIFIC DESCRIPTION

The motor, according to the invention, is conceived so as to permit the complete use of the machine's own magnetic field, the magnetic field of the rotor short-circuiting ring current closing on a circuit formed out of a part of the stack of rotor sheets, that is shorter than the stack of stator sheets proper. The stack of stator sheets includes a supplementary stack of statoric sheets with the same number of slots as the main stack of stator sheets, with the teeth of the slots of the supplementary stack being elongated to the central area up to the level of the rotor short-circuiting ring inner diameter, and separated from the corresponding elongation of the slots isthmuses, an axial air-gap between this supplementary stack of stator sheets central area and torus of electrotechnical steel-sheets enclosed in the brake deblocking movable armature, part of the brake deblocking armature and an axial air gap between this last and the surface of the stack of rotoric sheets from under the correspinding short-circuiting ring, summing up in the air-gap between the supplementary stack of stator sheets central zone. A torus of electrotechnical steel-sheet, is incorporated in the brake deblocking armature is attracted by the magnetic field created by an excitation winding of common both to the stack of stator sheets proper and to the supplementary stack of statoric sheets, that makes possible the summing of the initial (starting) current effect from the rotor short-circuiting ring, that gives birth to an impact stress, attracting very fast the brake deblocking armature, with the combined effect of the two fields, stator and of the rotor short-circuiting ring current, to maintain the brake deblocking armature in the "attracted" position, even in the presence of high forces, generated by the brake deblocking springs. The brake deblocking armature has the possibility of axial movement, without revolving together with the shaft, being fixed on it by means of a bearing. The brake proper is exterior to the machine, and the setting of the braking torque value and the correction of the friction materials wear effects is achieved by means of a screw nut, screwed on the motor axis.

The motor, according to the invention, has the usual stator 1, extended by a supplementary stack of statoric sheets 2, both of them having the same number of slots and the common winding 3.

Figure 1:
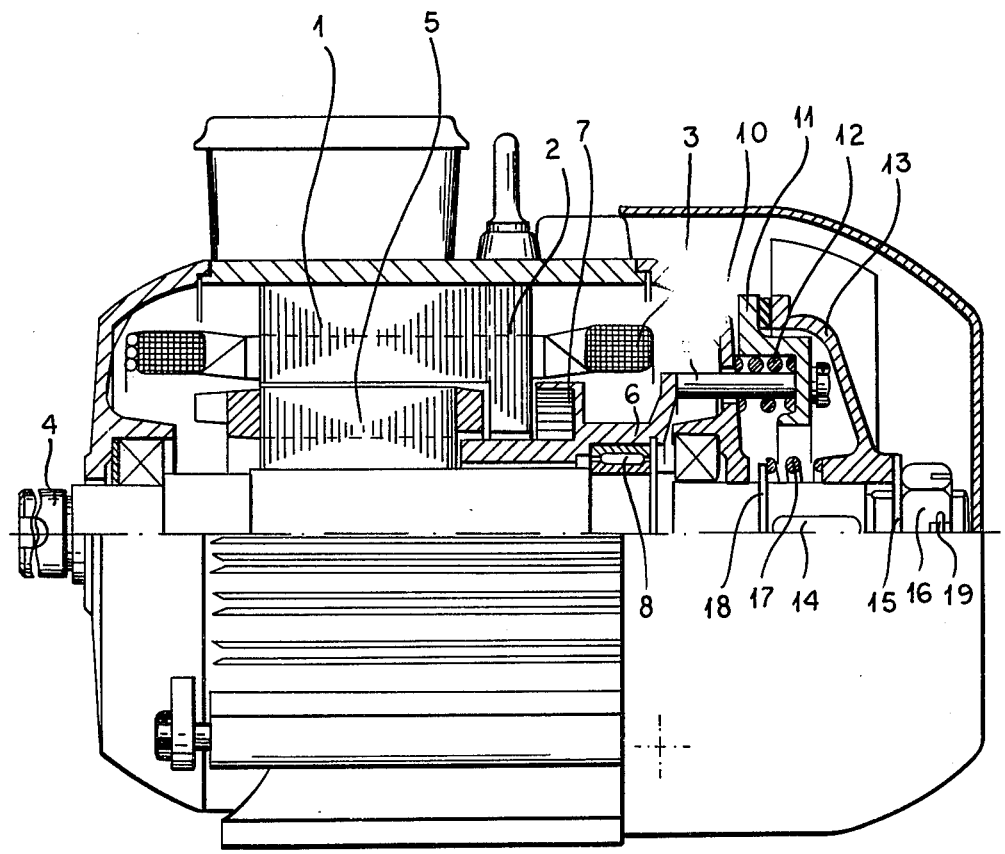
FIG. 1 is an elevational view seen in axial cross section at its upper half, of an electric motor with braking capacity according to the invention.
Figure 2:
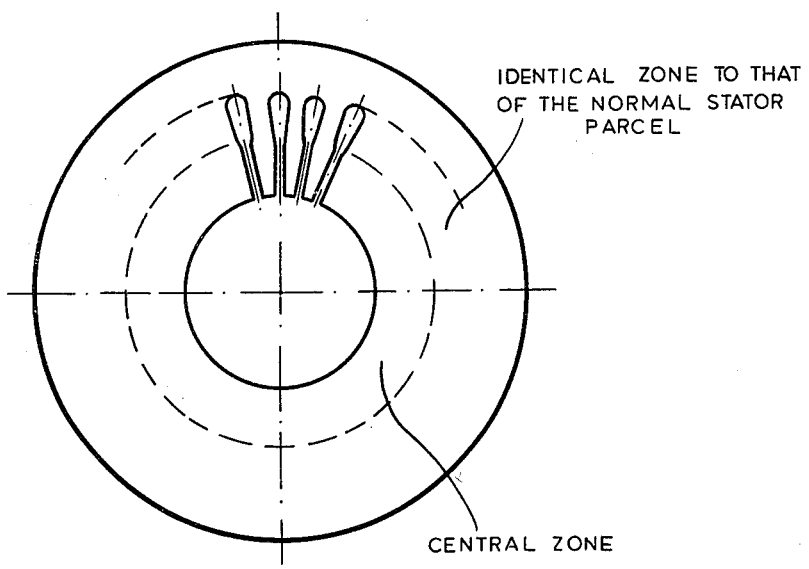
FIG. 2 is a diagrammatic end view of the supplementary stack of stator sheets.

On the motor shaft 4 there is a conventional rotor stack sheets 5 which is shorter than the stack of stator sheets 1, with the ventilation flanges only on the opposite side of the supplementary stack of statoric sheets 2. A brake deblocking armature 6 is mounted on the shaft 4 by means of a pin bearing 8 which enables axial movement of the armature 6. The active part of the brake deblocking armature 6, in front of the central area of the supplementary stack of stator sheets 2 is formed by a torus 7, created by rolling an electrotechnical strip. The brake deblocking movable armature 6 has pins 9 that protrude the motor through the holes in the shield 10. The pins 9 hold one of the friction parts 11, that is pressed by springs 12 against the other friction part 13, that plays, at the same time, the part of a ventilator. The ventilator is fixed on the shaft by a cylindrical sliding fit and a key 14, and held pressed against the collar 15 and the adjusting screwing nut 16 by the spring 17, that props itself against a baffle of the shaft 4 by the collar 18. The adjusting screwing nut 16 is of the splined type, into which extends the stop pin 19, that protrudes the end of the shaft 4 through a radial hole. When the stator winding 3 is not supplied with electrical energy, the springs 12 press the friction piece 11 against the friction piece 13. Between the friction pieces contacting surfaces, that may be flat, as in FIG. 1, or conical, the braking force that blocks the shaft 4 is produced.

When the stator winding 3 is supplied with electrical energy,, on the brake debloking armature 6, by means of its two active surfaces, one in front of the stack of rotor sheets 5 under the short circuiting ring, and the other in front of the supplementary stack of statoric sheets, 2, the central area inside the winding 3, the magnetic field created by the current that flows through the rotor 5, short-circuiting ring, combined with the magnetic field created by the stack of statoric sheets 3 in the area of the supplementary stack of stator sheets 2, exerts an attraction force, that compresses the springs 12, creating a space between the friction part 11 and the friction part 13, eliminating thus the braking force.

To adjust the braking force, the stop pin 19 is taken out and the screwing nut 16 is rotated, nut that screws itself on the shaft 4, creating thus a variation of the braking torque value. By means of the same screwing nut 16, in the same way, the effect of the frictional material wear may be nullified by periodic adjustment.

The motor, according to the invention, has the following advantages:

good use of the intrinsic magnetic field for the simultaneous generation both of the revolving torque on the rotor and of the electromagnetic force for deblocking the brake;

the possibility of achieving high braking torque;

safety in operation, by avoiding the axial displacement of the shaft and the achievement of a junction between the shaft and the brake deblocking movable armature, that allows the axial displacement of this armature without rotation with the shaft;

small size and weight;

short response times, both at brake deblocking and blocking;

simplified manufacturing technology;

good opportunities for release of heat generated by friction;

simple adjusting from the exterior, of the braking torque value;

simple correction, from the exterior, of the friction materials wear.

We claim:

1. An asynchronous electric motor with braking capabilities, comprising:

a motor housing;

a shaft journaled in said housing;

a rotor mounted on said shaft in said housing and comprising a stack of rotor sheets of a given length, and a rotor short-circuiting ring at one end of said rotor stack;

a stator surrounding said rotor and comprising a main stator stack of electrical sheets equal in length to said given length, a supplementary stack of electrical sheets at said end of said stator and extended inwardly to flank said ring, said stacks of said stator being provided with slots receiving an excitation winding and said slots being extended in said supplementary stack inwardly to define teeth;

a brake armature mounted by a bearing on said shaft for axial movement relative to said shaft and prevented from rotation relative to said shaft by said housing, said armature comprising a cylindrical portion reaching axially inwardly of said ring and a further portion juxtaposed with an axially confronting said teeth whereby the energization of said coil generates a magnetic field in said stator stacks and in said ring which acts additively upon said portions to displace said armature; and a brake in said housing operatively connected to said armature for deblocking upon the magnetic attraction of said armature.

2. The motor defined in claim 1 wherein said other portion of said armature receives a coiled electrical sheet strip in the form of a torus juxtaposed with said teeth to reduce eddy current losses upon magnetic attraction of said armature.

3. The motor defined in claim 1 or claim 9 wherein said housing is provided with a wall separating a motor compartment from a ventilator compartment, said motor compartment receiving said stacks and said ventilator compartment receiving said brake, said brake comprising a ventilator mounted on said shaft for rotation therewith in said ventilator compartment and forming a first brake member, a second brake member juxtaposed with said first brake member, a spring urging said second brake member toward said first brake member, and a pin traversing said wall and connecting said armature with said second brake member.

4. The motor defined in claim 3 wherein a further spring on said shaft urges said ventilator against a stop, further comprising means for adjusting the position of said stop on said shaft to allow compensation for wear of said brake.

* * * * *